April 6, 1954   R. IREDELL III   2,674,370
ARTICLE ISOLATING SHOCK ABSORBING SHIPPING CONTAINER
Filed April 11, 1950   4 Sheets-Sheet 1
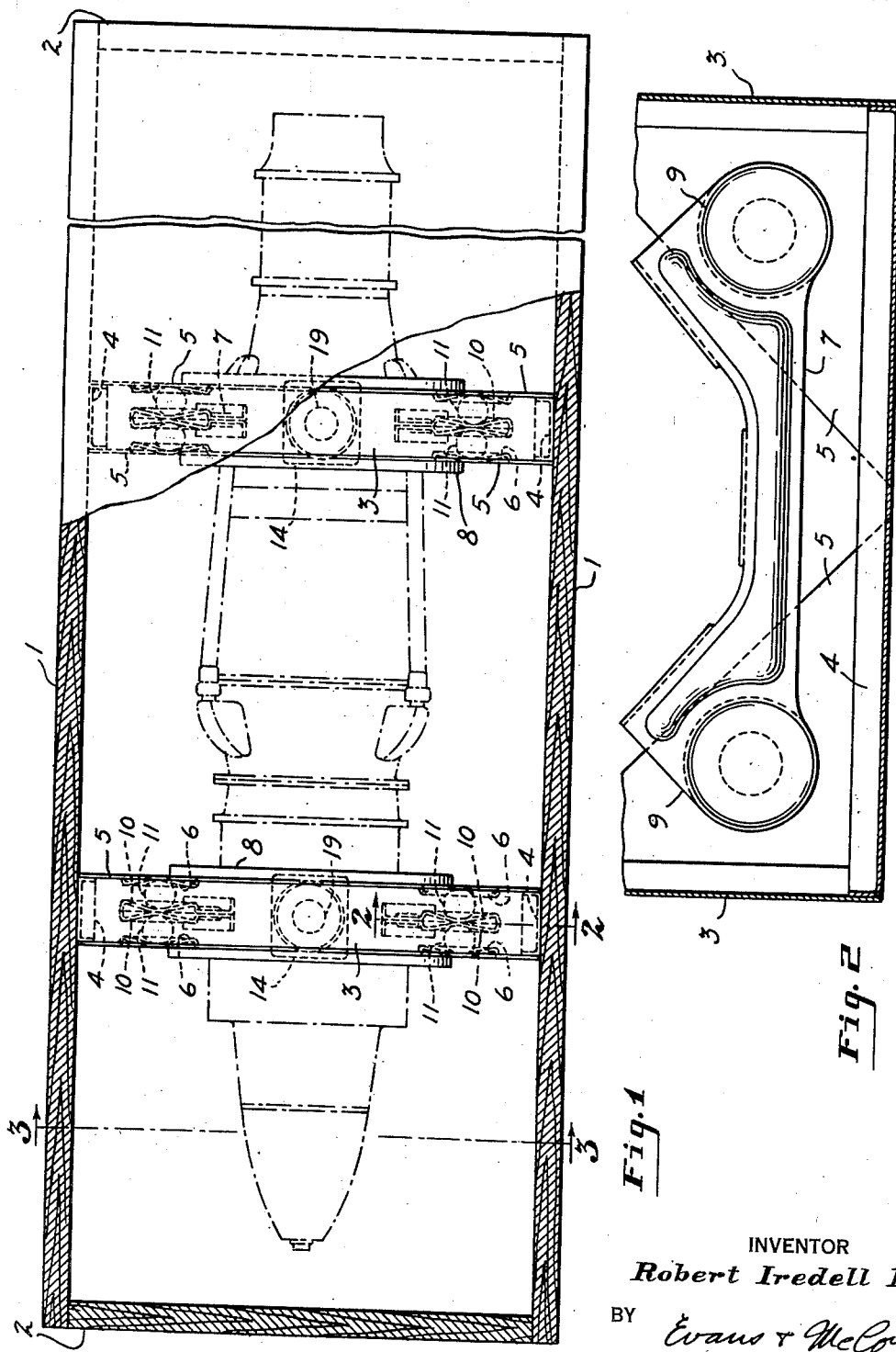
INVENTOR
Robert Iredell III
BY Evans & McCoy
ATTORNEYS April 6, 1954　　　　　　　R. IREDELL III　　　　　　　2,674,370
ARTICLE ISOLATING SHOCK ABSORBING SHIPPING CONTAINER
Filed April 11, 1950　　　　　　　　　　　　　　　　　　4 Sheets-Sheet 2

INVENTOR
Robert Iredell III
BY
Evans & McCoy
ATTORNEYS

April 6, 1954 R. IREDELL III 2,674,370
ARTICLE ISOLATING SHOCK ABSORBING SHIPPING CONTAINER
Filed April 11, 1950 4 Sheets-Sheet 3

INVENTOR
Robert Iredell III
BY Evans & McCoy
ATTORNEYS

April 6, 1954 R. IREDELL III 2,674,370
ARTICLE ISOLATING SHOCK ABSORBING SHIPPING CONTAINER
Filed April 11, 1950 4 Sheets-Sheet 4
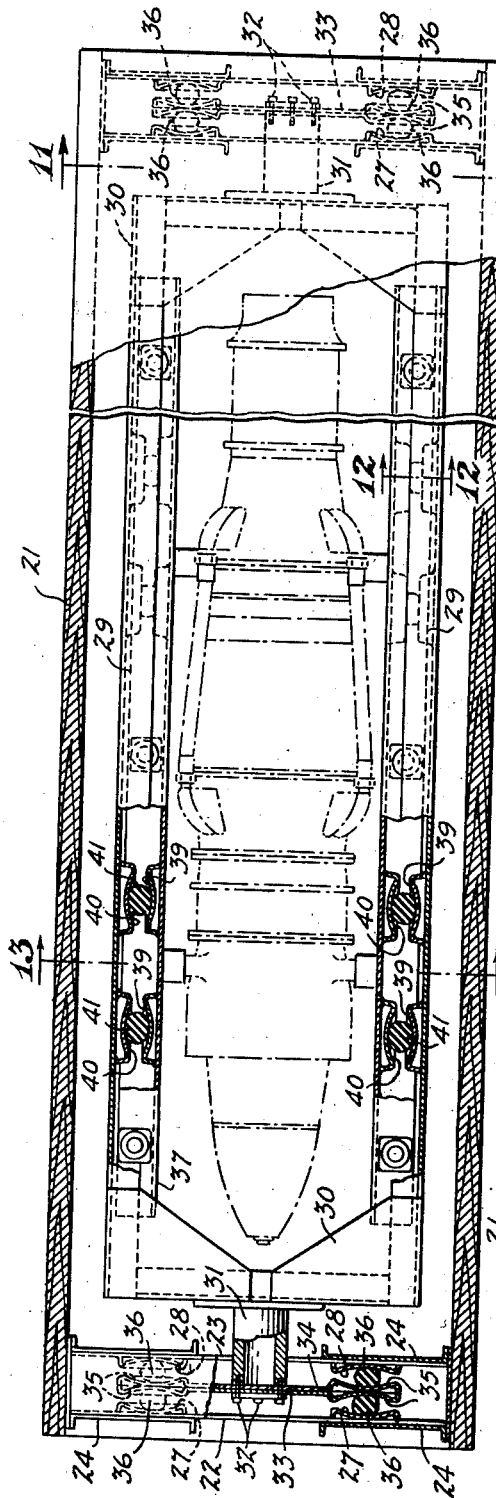
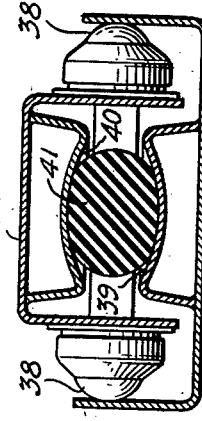
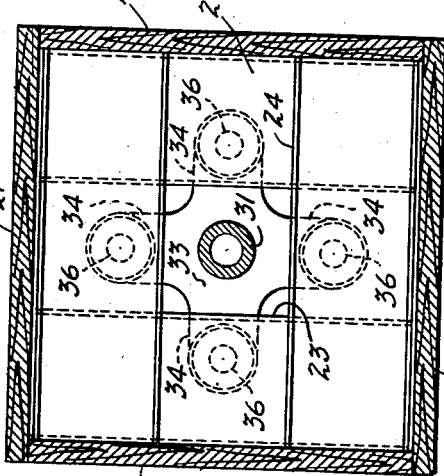
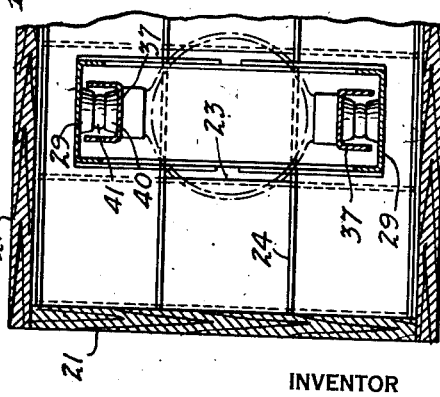
INVENTOR
*Robert Iredell III*
BY
*Evans + McCoy*
ATTORNEYS

Patented Apr. 6, 1954

2,674,370

UNITED STATES PATENT OFFICE 2,674,370

ARTICLE ISOLATING SHOCK ABSORBING SHIPPING CONTAINER

Robert Iredell III, Wabash, Ind., assignor to The General Tire and Rubber Company, Akron, Ohio, a corporation of Ohio Application April 11, 1950, Serial No. 155,179

19 Claims. (Cl. 206—46)

This invention relates to article isolating shock absorbing shipping containers, and particularly to containers for protecting expensive machinery against damage due to impacts caused by rough handling or accidents occurring in shipment.

The invention has for an object to provide the container with a shock absorbing article isolating internal structure which will effectually protect the article against damage.

A further object is to provide an article holder within the container that is cushioned against impacts in any direction by elastic rubber shock absorbing members.

Reference should be had to the accompanying drawings forming a part of this specification in which:

Figure 1 is a side elevation of a container embodying the invention, a portion of the container being broken away to show the interior framework;

Fig. 2 is a fragmentary vertical section taken on the line indicated at 2—2 in Fig. 1;

Fig. 10 shows a modified form of container embodying the invention viewed partly in side elevation and partly in longitudinal section;

Fig. 11 is a section taken on the line indicated at 11—11 in Fig. 10;

Fig. 12 is a section taken on the line indicated at 12—12 in Fig. 10; and

Fig. 13 is a fragmentary section taken on the line indicated at 13—13 in Fig. 10.

In Figs. 1 to 9 of the drawings there is shown a shipping container embodying the invention which has longitudinal walls 1 and end walls 2 which may be formed of wood or other suitable material. The longitudinal walls 1 provide support for the article supporting framework within the container and form part of an outer rigid frame formed by the walls 1 and longitudinally spaced rectangular metal frames secured to the interior faces of the walls 1 and each comprising vertical channel bars 3 and horizontal channel bars 4 connecting the upper and lower ends of the bars 3, the bars 3 and 4 being rigidly attached to the side and top and bottom walls of the container. The rectangular frames formed by the bars 3 and 4 serve to brace the container walls and also provide means for mounting an article carrier within the container. Two or more rectangular frames may be provided along the length of the container, the number of rectangular metal frames provided being determined by the character of the article to be shipped. For a short article a single rectangular frame may suffice, but for elongated articles such as herein shown it is preferred to provide longitudinally spaced supports.

Figure 9:
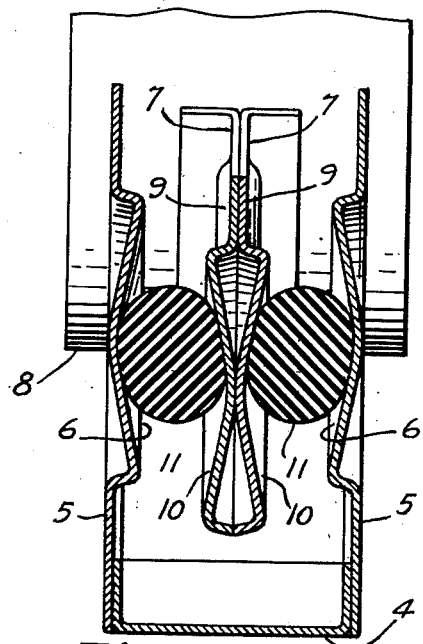
Fig. 9 is a section on the same line as Fig. 8, showing the inner frame radially displaced with respect to the outer frame and the cushioning balls under compression between the offset concave seats.

Each of the rectangular frames has triangular corner plates 5 secured to the flanges of the channel bars by welding or other suitable means, and the plates 5 at each corner of the frame are provided with opposed dished concave seats 6. The plates 5 are disposed in planes substantially perpendicular to the walls 1 and to the axis of the container that is parallel to the walls 1 and serve as guide members for an inner relatively movable frame. The inner frame has guide members in the form of spaced rectangular frames having top and bottom crossbars 7 that receive between them a frame member 8 in the form of a channel bar bent to polygonal form to provide a polygonal article receiving opening. The ends of the bars 7 have guide portions 9 that project into the spaces between the plates 5 of the outer frame. The guide portions 9 are provided with oppositely facing dished concave seats 10 that are disposed between the seats 6 of the guide plates 5 and mounted between the opposed seats 6 and 10 are elastic rubber balls 11 that have rolling engagement with the seats 6 and 10. The balls 11 normally engage in the bottoms of the recess seats and, since opposed seats converge in all directions from the center, a movement of the inner seats 10 in a direction parallel to the plates 5 will cause the balls to be compressed between the inclined faces of the seats as illustrated in Fig. 9 of the drawings, to yieldably resist such movements.

Figure 3:
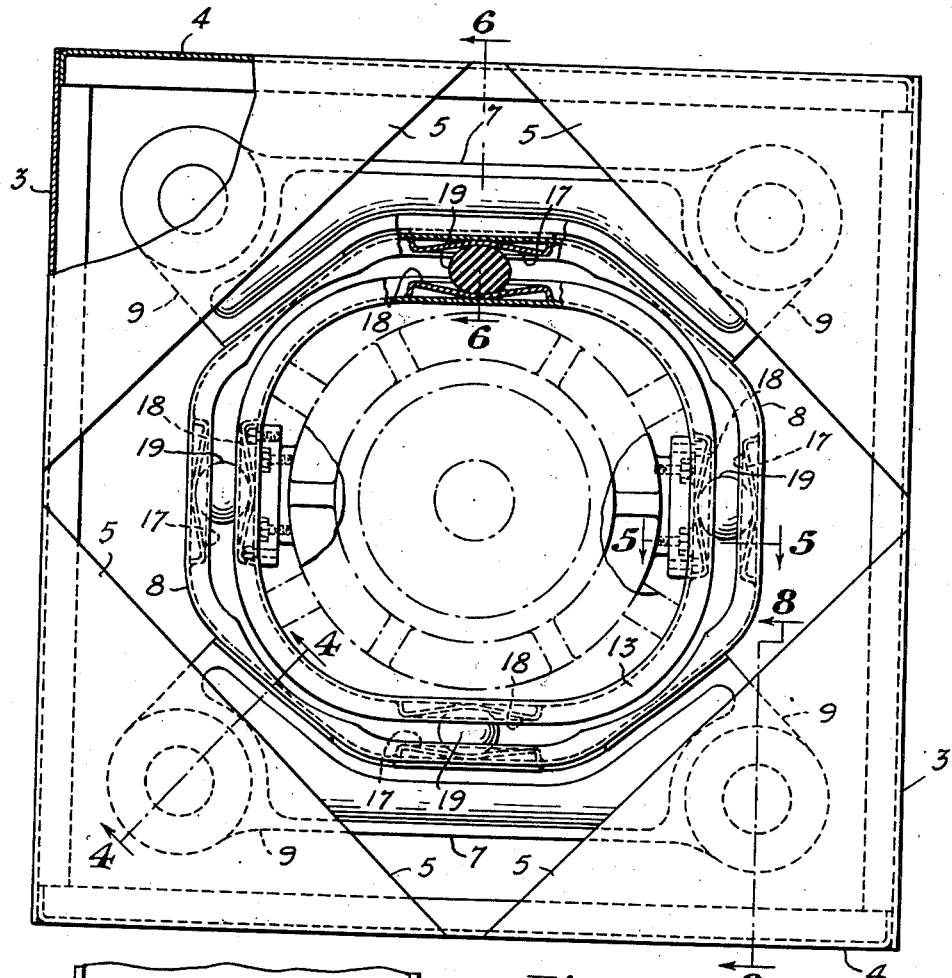
Fig. 3 is a transverse vertical section taken on the line indicated at 3—3 in Fig. 1.
Figure 4:
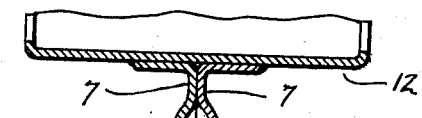
Fig. 4 is a fragmentary section taken on the line indicated at 4—4 in Fig. 3.
Figure 5:
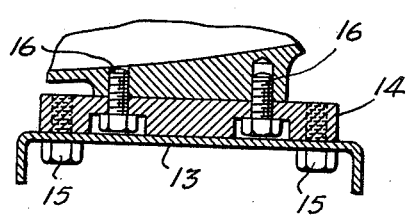
Fig. 5 is a fragmentary section taken on the line indicated at 5—5 in Fig. 3.
Figure 6:
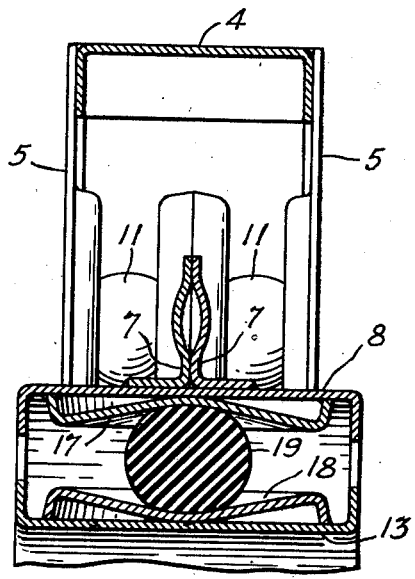
Fig. 6 is a fragmentary section taken on the line indicated at 6—6 in Fig. 3

Within each of the rectangular frames there is mounted an article holder in the form of a band 13 adapted to encircle the article to be supported. As shown in Figs. 3 and 5, the bands 13 are rigidly attached to the article so that the article is constrained to move with the bands 13. As herein shown each band 13 is attached at diametrically opposite points to adapter plates 14 by means of bolts 15, and the adapter plates are secured to the supported articles by suitable means such as bolts 16.

Figure 7:
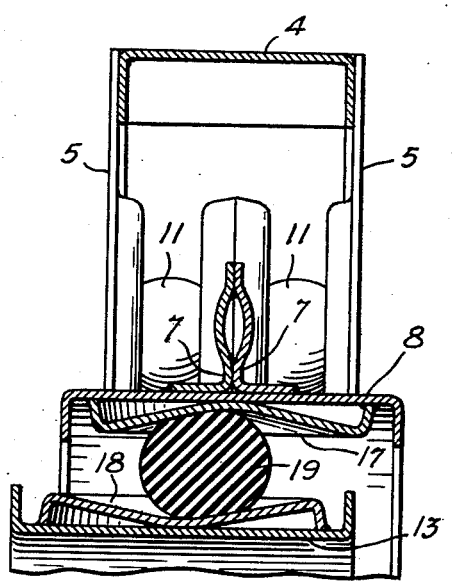
Fig. 7 is a section similar to Fig. 6, showing the article holder offset with respect to the frame in which it is mounted, and the cushioning ball under compression between the offset seats.
Figure 8:
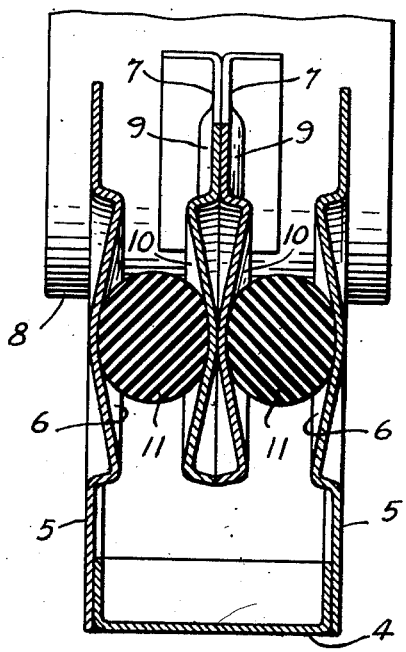
Fig. 8 is a section taken on the line indicated at 8—8 in Fig. 3.

The inner frame member 8 has dished concave seats 17 attached thereto which face inwardly toward the longitudinal axis of the container. The band 13 has outwardly facing dished concave seats 18 that are opposed to the seats 17. Elastic rubber balls 19 are mounted between the seats 17 and 18 and these balls are compressed between the tapering portions of the opposed seats when the article holder is displaced axially with respect to the seats 17 as shown in Fig. 7 of the drawings.

The spaced rectangular metal frames formed by the channel bars 3 and 4 rigidly connected through the walls of the container form a rigid outer supporting frame, the rectangular frames formed by the bars 7 and 8 provide an inner laterally movable supporting frame, and the bands 13 provide an article carrier axially movable in the inner frame. Since the guide plates 5 are disposed in planes perpendicular to the container axis and the seats 10 carried by the inner frame are also disposed substantially at right angles to the container axis, the inner frame is held against any substantial axial movements, but can move laterally in any direction radial to the longitudinal axis of the container. The rubber balls 11 have a slight longitudinal cushioning action, but the amount of longitudinal movement permitted to the inner frame is slight as compared to the radial movement, which causes a wedging action between the opposed concave seats 6 and 10 and the balls mounted between them.

The article holding bands 13 are rigidly connected and held in properly spaced relation by their attachment to an article mounted within them, such as the jet engine herein shown. Since the seats 17 and 18 on the article holder bands and the inner frame members are all disposed in planes substantially parallel to the longitudinal axis of the container, the lateral movements of the holder in the inner frame permitted by compression of the rubber balls 19 is slight as compared to the axial movement of the article and holder as illustrated in Fig. 7.

Impacts tending to cause the article to move laterally in the container are cushioned by the rubber balls 11 which have a snubbing action limiting the extent of movement of the inner frame members. Forces tending to move the article lengthwise of the container are cushioned by the balls 19 which also have a snubbing action to limit the axial movement of the article holder. Cushioning in lateral directions is resisted mainly by the rubber balls 11, but the balls 19 also assist in the cushioning action, providing an additional cushion between the holder and the inner frame when the inner frame approaches the limit of its lateral movement. The axial movements of the article in the container are cushioned mainly by the balls 19, but the balls 11 also assist in cushioning the axial forces as the article holders approach the limit of their axial movement in the inner frame.

In Figs. 10 to 13 of the drawings a modified construction is shown in which a container has longitudinal walls 21 with frames 22 mounted in the ends thereof and serves as an outer frame for supporting an inner article holding structure. The end frames 22 are provided with spaced vertical walls formed by vertical and horizontal flanged plates 23 and 24. The inner and outer plates are disposed back to back and are somewhat less than half the width of the container so as to provide a central rectangular opening. On the inner faces thereof the plates 23, 24, 25 and 26 have oppositely facing dished seats 27 and 28. Four pairs of such seats are provided equiangularly spaced around the axis of the container. An inner frame is provided that is composed of horizontally disposed top and bottom channels 29 which extend throughout the major portion of the length of the container and which are rigidly connected at their ends by vertical cross members 30.

Tubular extensions 31 are attached centrally to the end members 30 and the outer ends of the tubular extensions are rigidly attached by bolts 32 to vertically disposed spiders 33 which are disposed between the spaced walls of the end frames. The spiders 33 have arms 34 which extend into the spaces between the dished seats 27 and 28 and these arms have oppositely facing dished seats 35 that are opposed to the seats 27 and 28 of the outer frame. The seats 27, 28 and 35 are disposed substantially perpendicular to the longitudinal axis of the container and the spiders and plates to which these seats are attached form guide members which limit longitudinal movements of the inner frame and permit the inner frame to move bodily in directions radial to the longitudinal axis of the container. Elastic rubber balls 36 are mounted between the seats 35 and the seats 27 and 28 and have rolling engagement with the seats. Upon radial movements of the inner frame the balls 36 become wedged between the tapering faces of the seats and have a snubbing action to limit the radial movements of the inner frame.

An article holder is mounted for axial movement within the inner frame, and this holder comprises longitudinal channel bars 37 that are rigidly attached by suitable means to opposite sides of an article such as a jet engine mounted therein. The channel bars 37 face outwardly and are positioned between the flanges of the channel bars 29 of the inner frame. Guide members 38 attached to the channel bars 37 guide the bars 37 longitudinally in the frame bars 29. In the channels 29 and 37 oppositely facing dished concave seats 39 and 40 are provided at intervals along the length of the bars and elastic rubber balls 41 are mounted between the seats in rolling engagement therewith. The balls 41 permit slight radial movements of the holder in the inner frame but have much greater yieldability in an axial direction, so that the movement of the article holder within the inner frame is mainly in an axial direction, while the movement of the inner frame in the container is mainly in directions at right angles to the longitudinal axis of the container. The rubber balls 36 assist in cushioning the axial movements of the holder and the balls 41 assist in cushioning the radial movements of the holder as in the modification first described.

The shock absorbing devices of the present invention, which are arranged to cushion shocks in all directions, provide an effective protection for fragile or expensive machinery which may be rigidly secured in any suitable manner to the holder. In each instance one set of impact cushioning members cushions axial thrusts and another set of cushioning members cushions radial thrusts in any direction, so that the article has a limited universal movement within the container, all movements being substantially equally cushioned.

It is to be understood that in accordance with the provisions of the patent statutes, variations and modifications of the specific devices herein shown and described may be made without departing from the spirit of the invention.

What I claim is:

1. An article isolating shock absorbing shipping container comprising an outer frame, an inner frame within the outer, an article holder within the inner frame, and cushioning supports for said inner frame and said holder comprising pairs of opposed concave seats spaced circumferentially about an axis of the container, one seat of each of said pairs being attached to the inner frame and the other seats of said pairs being attached, some to the outer frame and others to said holder, the seats attached to the holder being disposed in planes at an angle to the planes of the seats attached to the outer frame and an elastic rubber ball interposed between and in rolling engagement with the opposed seats of each pair.

2. An article isolating shock absorbing shipping container comprising an outer frame, an inner frame within the outer, an article holder within the inner frame, and cushioning supports for said inner frame and said holder comprising pairs of opposed concave seats spaced circumferentially about an axis of the container, one seat of each of said pairs being attached to the inner frame and the other seats of said pairs being attached, some to the outer frame and others to said holder, the seats of the inner frame that are opposed to the seats of the outer frame being disposed in planes substantially at right angles to the planes of the seats of the inner frame that are opposed to the seats of the article holder, and an elastic rubber ball interposed between and in rolling engagement with the seats of each pair.

3. An article isolating shock absorbing shipping container comprising an outer frame, an inner frame within the outer, an article holder within the inner frame, and cushioning supports for said inner frame and said holder comprising pairs of opposed concave seats spaced circumferentially about an axis of the container, one seat of each of said pairs being attached to the inner frame and the other seats of said pairs being attached, some to the outer frame and others to said holder, the seats of the inner frame that are opposed to the seats of the outer frame being disposed in planes substantially perpendicular to said axis and the seats of the inner frame that are opposed to the seats of the article holder being disposed in planes substantially parallel to said axis, and an elastic rubber ball interposed between and in rolling engagement with the seats of each pair.

4. An article isolating shock absorbing shipping container comprising inner and outer frames, guide members fixed to said inner and outer frames and disposed substantially perpendicular to an axis of the container, said guide members being spaced longitudinally of said axis and having dished concave seats spaced circumferentially around said axis, the dished concave seats on the outer frame guide members facing dished concave seats on the inner frame guide members, elastic rubber balls having a radius of curvature less than that of said seats interposed between oppositely facing seats and in rolling engagement therewith for cushioning radial inner frame movements, said balls, seats, and perpendicular guide members forming the sole supporting means for said inner frame whereby substantial rolling movement is permitted in directions perpendicular to said axis, and an article holder and means interposed between said inner frame and said holder yieldably supporting said holder within said inner frame.

5. An article isolating shock absorbing shipping container for an article to be shipped comprising inner and outer frames, guide members fixed to said inner and outer frames and disposed substantially perpendicular to an axis of the container, said guide members being spaced longitudinally of said axis and having dished concave seats spaced circumferentially around said axis, the concave seats on the outer frame guide members facing concave seats on the inner frame guide members, elastic rubber balls interposed between oppositely facing seats and in rolling engagement therewith for cushioning inner frame movements transverse to said axis, an inner frame supported article holder mounted for linear movements in the direction of said axis, elastic rubber cushions interposed between said holder and said inner frame limiting the axial movements of said holder with respect to said inner frame, and means to mount said article within said article holder so that said article is encircled by said inner frame.

6. An article isolating shock absorbing shipping container comprising inner and outer frames, guide members fixed to said inner and outer frames and disposed substantially perpendicular to an axis of the container, said guide members being spaced longitudinally of said axis and having concave seats spaced circumferentially around said axis, the concave seats on the outer frame guide members facing concave seats on the inner frame guide members, elastic rubber balls interposed between oppositely facing seats and in rolling engagement therewith for cushioning radial inner frame movements, an inner frame supported article holder having outwardly facing concave seats disposed in planes substantially parallel to said axis and spaced circumferentially around said axis, inner frame members having concave seats attached thereto and opposed to said holder seats, and elastic rubber balls interposed between and in rolling engagement with the holder and inner frame seats to cushion axial movements of the holder.

7. In an article isolating shock absorbing shipping container, an article to be shipped, an outer frame, an inner frame enclosed within the outer, pairs of guide plates attached to one of said frames, said pairs of plates being spaced longitudinally of a container axis and disposed substantially perpendicular to said axis, the plates of each pair having opposed dished concave seats, intermediate guide plates attached to the other of said frames and disposed parallel to and between the plates of said pairs, said intermediate guide plates having concave seats opposed to the concave seats of the pairs of plates between which they are interposed, elastic rubber balls interposed between each intermediate plate and the plate of the pair receiving the intermediate plates between them, said balls having rolling engagement with said concave seats to cushion radial movements of said inner frame, said dished concave seats yieldingly restricting rolling movements of said balls in all directions perpendicular to said axis, an article holder yieldably mounted within said inner frame, and means to mount said article within said article holder so that said article is encircled by said inner frame.

8. An article isolating shock absorbing shipping container comprising an outer frame, an inner frame enclosed within the outer, guide members fixed to said frames and disposed substantially perpendicular to an axis of the container, the guide members of one frame being disposed between guide members of the other and opposed faces of said guide members having opposed concave seats, said guide members being spaced longitudinally of said axis and said seats being spaced circumferentially around said axis, elastic rubber balls interposed between the guide members and having rolling engagement with the opposed concave seats to yieldingly resist radial movements of the inner frame within the outer, an article holder within said inner frame, guide members carried by the holder and provided with external concave seats spaced circumferentially with respect to said axis, guide members carried by the inner frame having internal concave seats opposed to the concave seats of the holder guide members, and elastic rubber balls interposed between said opposed seats of the holder and inner frame and having rolling engagement therewith to cushion axial movements of said holder.

9. An article isolating shock absorbing shipping container comprising an outer frame having concave seats disposed in planes substantially perpendicular to an axis thereof and spaced longitudinally of and circumferentially around said axis, an inner frame having concave seats opposed to the seats of the outer frame, elastic rubber balls interposed between and in rolling engagement with said seats for supporting the inner frame and yieldingly resisting radial movements thereof in the outer frame, an article holder comprising a band extending around said axis and having external concave seats spaced circumferentially thereof, concave seats carried by the inner frame and opposed to the seats of said holder, and elastic rubber balls interposed between the opposed seats of the holder and inner frame and in rolling engagement with said seats.

10. An article isolating shock absorbing shipping container comprising an outer frame having concave seats disposed in planes substantially perpendicular to an axis thereof and spaced longitudinally of and circumferentially around said axis, an inner frame having concave seats opposed to the seats of the outer frame, elastic rubber balls interposed between and in rolling engagement with said seats, said balls and seats providing the sole support for the inner frame and yieldingly resisting radial movements thereof in the outer frame, guideways carried by said inner frame, said guideways being on opposite sides of said axis and parallel thereto, an article holder within said inner frame supported in said guideways for movements longitudinally thereof, and shock absorbing cushions interposed between said holder and said inner frame yieldably resisting said longitudinal movements of said holder.

11. An article isolating shock absorbing shipping container comprising an outer frame having concave seats disposed in planes substantially perpendicular to an axis thereof and spaced longitudinally of and circumferentially around said axis, an inner frame having concave seats opposed to the seats of the outer frame, elastic rubber balls interposed between and in rolling engagement with said seats for supporting the inner frame and yieldingly resisting radial movements thereof in the outer frame, two channel bars carried by said inner frame, one on each side of said axis and parallel thereto, said channel bars being disposed with their channels facing said axis, an article holder having guide members slidable in said channels, inwardly facing concave seats opposed to said channel seats and carried by said holder, and elastic rubber balls interposed between said seats and in rolling engagement therewith.

12. An article isolating shock absorbing shipping container comprising an outer frame and wall structure surrounding an axis of the container, an inner frame encircled by said outer frame and surrounding said axis, means mounting said inner frame within said outer frame including guide members which restrain movements of said inner frame in said outer frame longitudinally of said axis but which permit movement therein in any direction radial to said axis, said inner frame mounting means including radially yieldable shock absorbing cushions angularly spaced about said axis and interposed between said inner and outer frames for yieldably resisting and limiting said radial movements of said inner frame in said outer frame, an article holder encircled by said inner frame, means mounting said article holder within said inner frame for movement therewith in said radial directions and for movement relative to said inner frame in the direction of said axis, said article holder mounting means including axially yieldable shock absorbing cushions interposed between said article holder and said inner frame for yieldably resisting and limiting said axial movements of said holder in said inner frame, said article holder having means to support an article within said inner frame.

13. An article isolating shock absorbing shipping container comprising an outer frame and wall structure surrounding an axis of the container, an inner frame encircled by said outer frame and surrounding said axis, means mounting said inner frame within said outer frame including guide members which restrain movements of said inner frame in said outer frame longitudinally of said axis but which permit movement therein in any direction radial to said axis, said inner frame mounting means including radially yieldable shock absorbing cushions angularly spaced about said axis and interposed between said inner and outer frames for yieldably resisting and limiting said radial movements of said inner frame in said outer frame, an article holder surrounding said axis within said inner frame, and means mounting said article holder within said inner frame for movement therewith in said radial directions and for movement therein in the direction of said axis, said article holder mounting means including axially yieldable shock absorbing cushions spaced angularly about said axis and interposed between said article holder and inner frame for yieldably resisting and limiting said axial movements of said holder in said inner frame, said article holder having means to support an article within said holder so that said article extends within and is encircled by said inner frame.

14. An article isolating shock absorbing shipping container comprising an outer frame and wall structure surrounding an axis of the container, an inner frame encircled by said outer frame and surrounding said axis, means mounting said inner frame within said outer frame for movement therein in any direction radial to said axis, said inner frame mounting means including guide members carried by said frames and disposed substantially perpendicular to said axis for restricting movement of said inner frame longitudinally of said axis and radially yieldable elastic rubber cushions angularly spaced about said axis and interposed between guide members carried by said inner frame and guide members carried by said outer frame for yieldably resisting and limiting said radial movements of said inner frame in said outer frame, an article holder, and means mounting said article holder within said inner frame for movement therewith in said radial directions and for movement therein in the direction of said axis, said article holder mounting means including axially yieldable elastic rubber shock absorbing cushions interposed between said article holder and said inner frame for yieldably resisting and limiting said axial movements of said holder in said inner frame.

15. An article isolating shock absorbing shipping container for an article to be shipped comprising an outer frame surrounding an axis of the container, an inner frame surrounding said axis, means mounting said inner frame within said outer frame for movement therein in any direction radial to said axis including guide members disposed transversely to said axis for restricting movement of said inner frame longitudinally of said axis, said inner frame mounting means including radially yieldable shock absorbing cushions interposed between said inner and outer frames for yieldably resisting and limiting said radial movements of said inner frame in said outer frame, an article holder surrounding said article, means mounting said article holder within said inner frame for movement therewith in said radial directions and for movement therein in the direction of said axis including guide members disposed longitudinally of said axis for restricting radial movement of said article holder with respect to said inner frame, said article holder mounting means including axially yieldable shock absorbing cushions interposed between said article holder and said inner frame for yieldably resisting and limiting said axial movements of said holder with respect to said inner frame, and means mounting said article within said article holder so that said article is located within said inner frame and along the axis of said container.

16. The apparatus defined in claim 15 wherein said radially yieldable cushions comprise pairs of opposed concave seat elements spaced circumferentially about said axis, roller elements for said pairs having a rounded cross section, one of said roller elements interposed between and in rolling engagement with the opposed seat elements of each pair, some of said elements including deformable resilient means to maintain contact between said seat elements and said roller elements, said resilient means being deformable to permit limited rolling movement of said roller elements.

17. The apparatus defined in claim 15 wherein said axially yieldable cushions comprise spaced pairs of opposed concave seat elements, ball elements for said pairs, one of said ball elements being interposed between and in rolling engagement with the opposed seats of each pair, the seat elements of each pair restricting the amount of rolling in all directions, some of said elements including resilient means to maintain contact between the surface of said seat elements and said ball elements, said resilient means being deformable to permit limited rolling movement of said ball elements.

18. An article isolating shock absorbing shipping container comprising an outer frame, an inner frame within the outer, an article holder within the inner frame, and cushioning supports for said inner frame and said holder comprising pairs of opposed concave seat members spaced circumferentially about an axis of the container, one seat member of each of said pairs being attached to the inner frame and the other seat members of said pairs being attached, some to the outer frame and others to said holder, the seat members of the inner frame that are opposed to the seat members of the outer frame being disposed in planes substantially perpendicular to said axis and the seat members of the inner frame that are opposed to the seat members of the article holder being disposed in planes substantially parallel to said axis, roller members for said pairs having a rounded cross section, one of said roller members interposed between and in rolling engagement with the seat members of each pair, some of said members including deformable resilient means to maintain contact between said seat members and said roller members, said last named means being deformable to permit limited rolling movement of said roller members.

19. An article isolating shock absorbing shipping container comprising an outer frame, an inner frame enclosed within the outer, guide members fixed to said frames and disposed substantially perpendicular to an axis of the container, the guide members of one frame being disposed between guide members of the other and opposed faces of said guide members having opposed concave seat elements, said guide members being spaced longitudinally of said axis and said seat elements being spaced circumferentially around said axis, roller elements of rounded cross section interposed between the guide members and having rolling engagement with the opposed concave seat elements to yieldingly resist radial movements of the inner frame within the outer, an article holder within said inner frame, guide members carried by the holder and provided with external concave seat elements spaced circumferentially with respect to said axis, guide members carried by the inner frame having internal concave seats opposed to the concave seats of the holder guide members, and roller elements of rounded cross section interposed between said opposed seats of the holder and inner frame and having rolling engagement therewith to cushion axial movements of said holder, some of said elements including resilient means to maintain contact between each roller element and its associated seat elements, said resilient means being deformable to permit limited rolling movement of said roller elements on said seat elements.

References Cited in the file of this patent

UNITED STATES PATENTS

| Number | Name | Date |
|---|---|---|
| 701,384 | Peck | June 3, 1902 |
| 2,171,774 | Wendes | Sept. 5, 1939 |
| 2,414,506 | Bowen | Jan. 21, 1947 |
| 2,469,156 | Cargill | May 3, 1949 |
| 2,502,322 | Iredell, Jr. | Mar. 28, 1950 |
| 2,549,906 | Johansson | Apr. 24, 1951 |

FOREIGN PATENTS

| Number | Country | Date |
|---|---|---|
| 12,358 | Great Britain | May 21, 1910 |